United States Patent [19]

Borroni

[11] 4,156,151
[45] May 22, 1979

[54] ELECTRIC APPARATUS FOR THE DISTRIBUTION OF ENERGY PARTICULARLY FOR VEHICLES

[75] Inventor: Mario Borroni, Turin, Italy
[73] Assignee: Fiat Societa per Azioni, Turin, Italy
[21] Appl. No.: 803,189
[22] Filed: Jun. 3, 1977
[30] Foreign Application Priority Data
  Jun. 4, 1976 [IT] Italy .................... 68365 A/76
[51] Int. Cl.² .............. H02J 1/00; H02J 4/00; H02J 13/00
[52] U.S. Cl. .................. 307/10 R; 307/9; 307/12; 340/147 CV; 340/167 A; 340/185
[58] Field of Search ............ 307/9, 10 R; 340/244 B, 340/59

[56] References Cited
U.S. PATENT DOCUMENTS

| | | | |
|---|---|---|---|
| 3,544,803 | 12/1970 | Taylor | 307/10 R |
| 3,846,639 | 11/1974 | Ueda | 307/9 |
| 3,864,578 | 2/1975 | Lackey | 307/10 R |

Primary Examiner—L. T. Hix
Assistant Examiner—S. D. Schreyer
Attorney, Agent, or Firm—Sughrue, Rothwell, Mion, Zinn and Macpeak

[57] ABSTRACT

A system for distributing electrical energy to the electric current consumer devices of an automobile without having to wire each consumer individually via a switch to the power source, comprising a central control unit connected to a plurality of remote control units by a single control line for each side of the automobile to which respective groups of consumers are connected. A single power line for each side of the vehicle runs from the power source to the remote control units which selectively energize the consumers in dependence on coded pulse signals received from the central control unit. Operation of the system is cyclic and includes time on the control line for a reverse flow of signals from sensors and/or check circuits to transmit to the central control unit for information and/or warning display on an instrument panel of the automobile.

4 Claims, 12 Drawing Figures

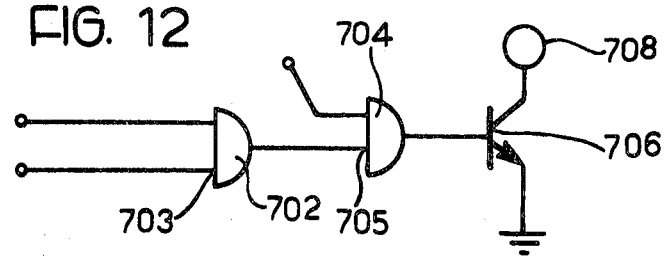
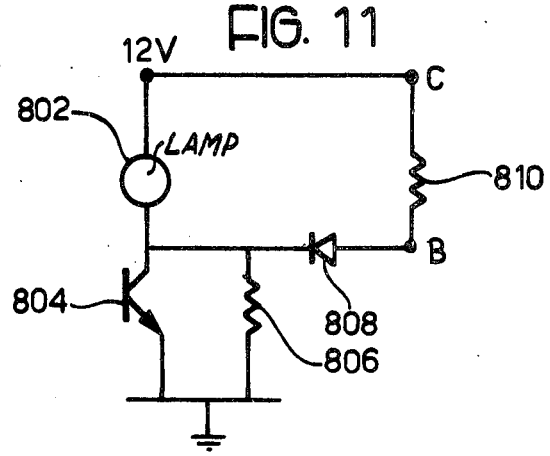
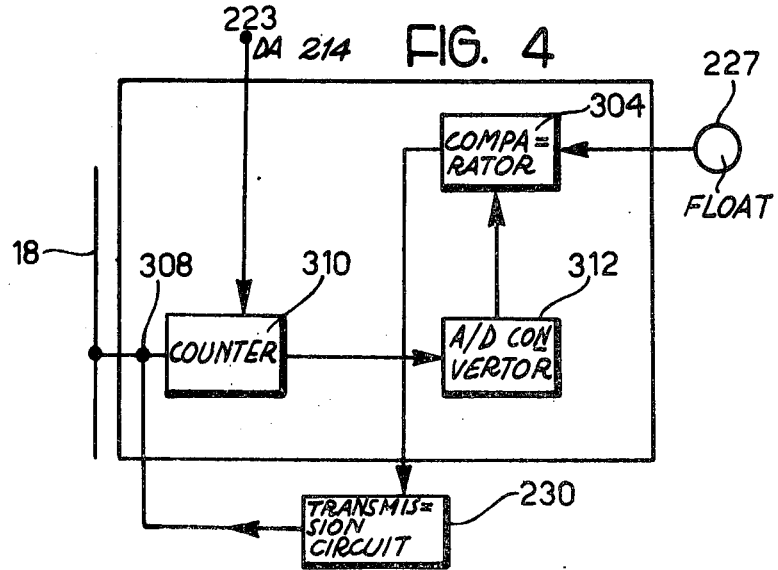

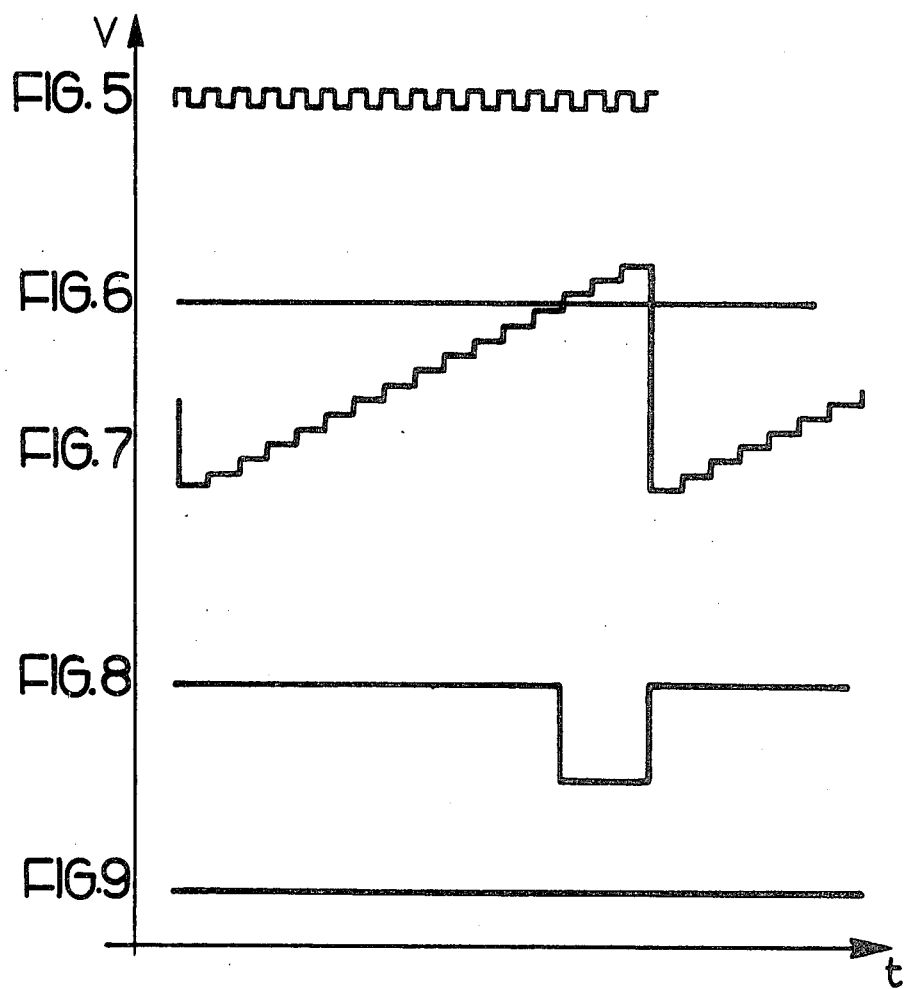
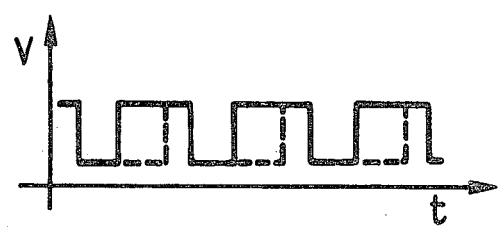

ELECTRIC APPARATUS FOR THE DISTRIBUTION OF ENERGY PARTICULARLY FOR VEHICLES

The present invention relates to electrical distribution and control apparatus for the electrical system of a motor vehicle, and particularly to such apparatus in which control of the operation of the vehicle's electrically operated devices is effected by means of transistor switches. For convenience all the electrically operated devices of a motor vehicle, such as the front and rear lights, windscreen wiper motor, fuel gauge, turn signal indicators, water temperature gauge, oil pressure gauge and the like will be referred to hereinafter merely as "current consumers," regardless of whether they merely consume electrical energy during operation of whether they also provide electrical signals for transmission back to an instrument panel.

In recent times there have been a number of different proposals of systems for the distribution of electrical energy around motor vehicles which have increasingly numerous current consumers. To simplify the wiring these proposals provide a reduced number of power lines to feed the current consumers, instead of a line for each in order to facilitate assembly and connection of the vehicle's electrical system.

In one known system a single power line leads from the current source to a point close to each group of current consumers on the vehicle and these are connected with the power line by a number of lines, one for each current consumer, which run from the consumers to the power line. These systems, however, have the disadvantage of requiring the use of a large number of lines.

There are also systems known which avoid this disadvantage by making use of a single power line with which is associated a small number of control lines which enable the various current consumers selectively with coded pulses by means of which the current consumers which it is desired to put into operation are identified.

In systems of this type the power line leads to a number of remote control units to each of which are connected the current consumers of an associated group. The control lines lead from a central control unit to the remote control units and each consumer can be energised by feeding an appropriate control signal to the remote control unit to which the consumer in question is connected.

However, this system also has a number of disadvantages, among which are the fact that the control circuits, given that there are a number of remote control units, are appreciably complex and costly, and the central control unit has to be able to send and receive a large number of signals to and from the remote control units and is therefore very complex and consequently highly expensive.

The technical problem which the present invention seeks to solve is that of providing an electrical energy distribution system for motor vehicles in which a single power line, having an associated single control line, can be used to feed a plurality of remote control units (not necessarily all of the remote control units on the vehicle) to which a plurality of current consumers are connected, and can also carry signals, from at least some of the current consumers, which vary slowly with time whilst still carrying control signals for some or all of the other current consumers. The present invention also seeks to provide an electrical energy distribution system for motor vehicles, having a single central control unit and a smaller number of remote control units than previously known such systems.

According to the present invention apparatus for the distribution of electrical energy on board vehicles, such as motor vehicles, from a source of electric current to one or more of a plurality of electric current consumers is characterised by the fact that it includes: at least one first conductor for electrical energy at power level, at least one second conductor for electrical control signals, at least one central control unit having means for generating coded pulse signals identifying the consumers to be energised and for transmitting these signals onto the said second conductor and means for decoding pulse signals received from the said second conductor, and a plurality of remote control units each associated with a group of current consumers of the vehicle and connected to the said second conductor, the said remote control units operating to connect selected consumers to the said first conductor to put them into operation in dependence on the coded pulse signals received on the said second conductor from the central control unit.

One embodiment of the present invention will now be more particularly described, by way of example, with reference to the accompanying drawings, in which:

FIG. 4 is a block diagram of an analogue circuit which forms part of the remote control unit illustrated in FIG. 3;

FIGS. 5 to 9 illustrate various waveforms which occur at various points in the circuit during the transmission of analogue signals;

FIG. 10 illustrates the voltage signal on the control line of the system during one stage of operation of the system;

FIG. 11 is a diagram of a check circuit which forms part of the remote control unit illustrated in FIG. 3; and FIG. 12 is a diagram of a circuit for selectively reducing the brightness of the stop and direction lamps of the vehicle.

Figure 1:
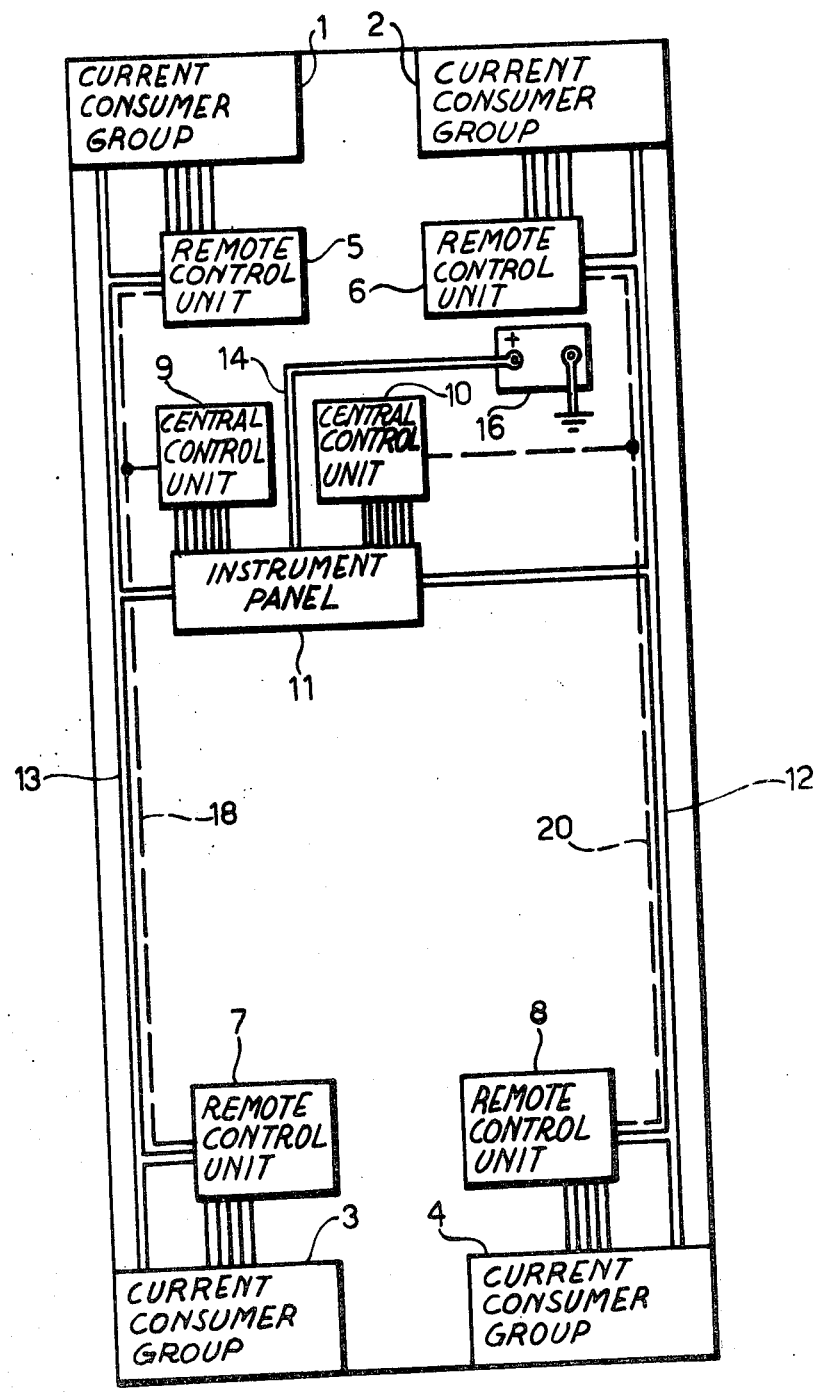
FIG. 1 is a block diagram showing the general arrangement on a motor vehicle of a system formed as an embodiment of the invention.

Referring now to the drawings, and particularly to FIG. 1 there is shown an electrical energy distribution system for a motor vehicle in which all the electric current consuming devices are connected in groups of which four, indicated by the reference numerals 1, 2, 3 and 4, are shown in FIG. 1. These may be, for example the left and right front lights 1 and 2, and the left and right rear lights 3 and 4. The left front light group 1 is connected, by a plurality of lines, one from each consumer, to an associated front left remote control unit 5, and the right front light group is similarly connected to a front right remote control unit 6. Left and right rear light groups 3, 4 are connected, likewise by a plurality of lines, to associated left and right rear remote control units 7, 8.

The two remote control units 5, 7 associated with the consumers on the left side of the vehicle are connected to an associated central control unit 9, by a control line 18, and the two remote control units 6, 8, associated with the consumers on the right side of the vehicle are connected by a control line 18 to a right central control unit 10. The two central control units 9, 10 are connected by a plurality of lines to an instrument and control panel which is also connected by respective left and right power lines 13, 12 to the left and right remote control units 5, 7 and 6, 8 and the left and right consumer groups 1, 3 and 2, 4. The instrument and control panel 11 is also connected by a power line 14 to the positive terminal of a battery 16 the negative terminal of which is connected to earth. It will be appreciated that the instrument and control panel 11 includes a plurality of control switches for selectively operating chosen consumers and a plurality of instruments which display signals received from consumers either continuously or when selectively operated by means of one of the switches of the control panel 11. The central control units thus operate a two-way transmission and reception of signals along the control lines 20, 18 in dependence on the particular circumstances of use and the particular control switches of the panel 11 operated at any one time.

Figure 2:
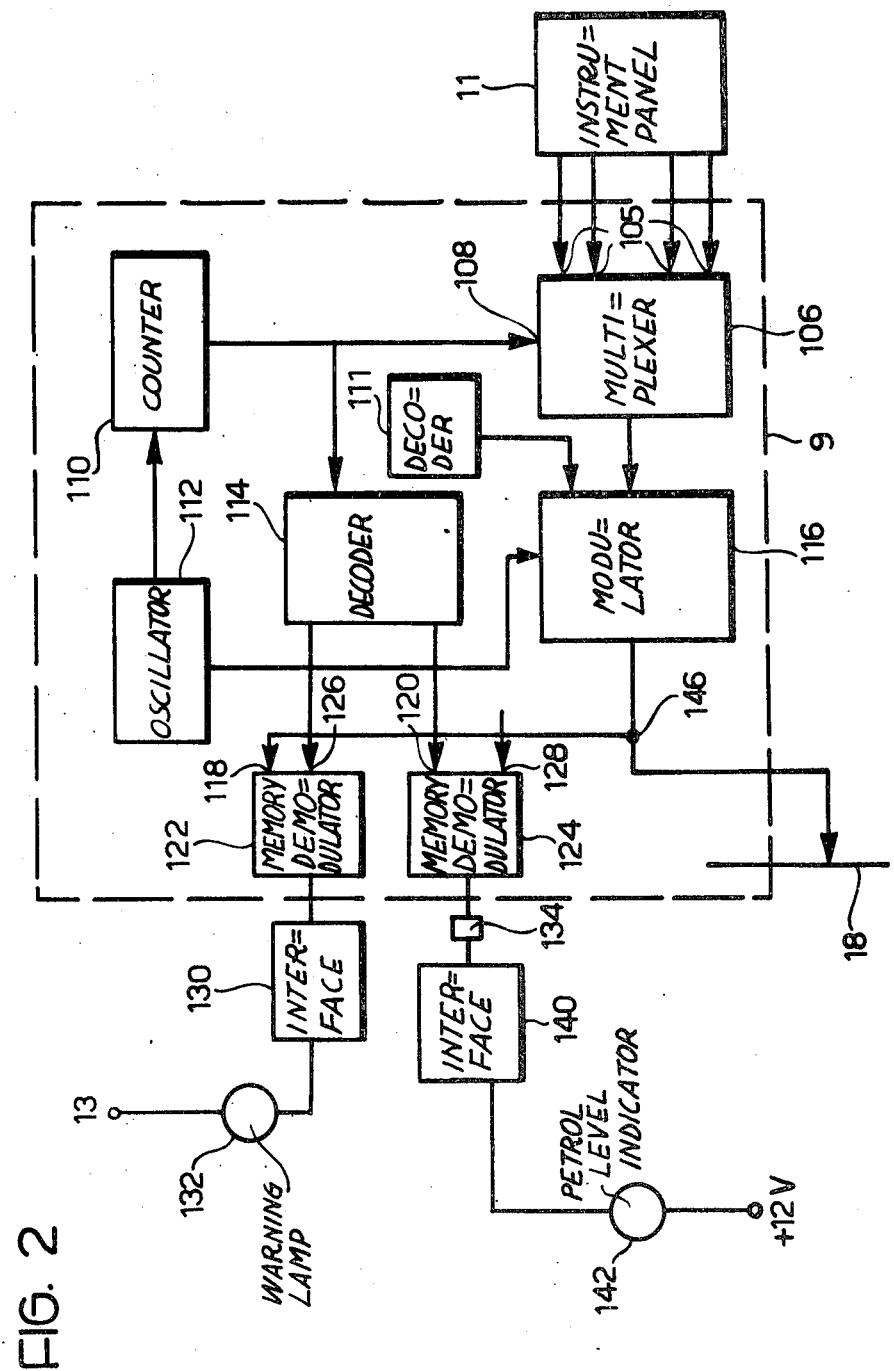
FIG. 2 is a block diagram of one of the central control units of the system shown in FIG. 1.

FIG. 2 illustrates in detail the left central control unit 9 of FIG. 1; as can be seen the unit 9 includes a multiplexer 106 having a plurality of parallel inputs 105 to which are connected respective lines from the instrument panel 11, each feeding, when energized, a signal from an associated switch or other control device of the panel 11 to the multiplexer 106. These signals all arrive in parallel at the multiplexer 106 if a plurality of lines are energised. The multiplexer 106 also has a control or clock input to which is fed a clock signal from a counter 110 which is connected to an oscillator 112 the frequency of which determines the frequency of the signal applied to the control line 18 as will be described below. The output of the counter 110 is also connected to a first decoder 111 and to a second decoder 114 the functions of which will be described below. The output of the multiplexer 106 is connected to a modulator 116 which is also fed with clock signals from the oscillator 112.

The output from the modulator 116 is connected to the control line 18 and also to the first inputs 118 and 128 of first and second memory-demodulators 122 and 124 respectively, having second inputs 126 and 120 to which are fed two output signals from the second decoder 114. The first memory-demodulator 122 is connected to a power interface 130 connected in its turn to a warning light 132.

The output signal from the second memory-demodulator 124 is fed to a low-pass filter 134 which is connected with a second power interface 140 connected in its turn to a fuel level indicator 142.

Under the control of the counter 110 the multiplexer 106 operates to feed out in serial form a train of pulses representing the state of the control devices on the instrument panel 11 which are connected in parallel to the inputs of the multiplexer 106. In this embodiment there are shown four input lines to the multiplexer 106 although it will be appreciated that this could be more or less. The counter 110 is set to count to a number greater than the number of parallel input lines to the multiplexer 106, hereinafter referred to as channels. When a predetermined count has been reached the first decoder 111 provides an output signal to the modulator 116 disabling this from further operation for a predetermined count by the counter 110. The output signal on the control line 18 thus comprises a first or scan portion comprising a train of pulses representing the signals on the channels connected to the input 105 of the multiplexer 106 indicative of the state of the control switches of the panel 11 in a predetermined sequence, followed by a break or pause in the transmission of signals during which time the central control unit can receive signals from the associated remote control units.

Figure 3:
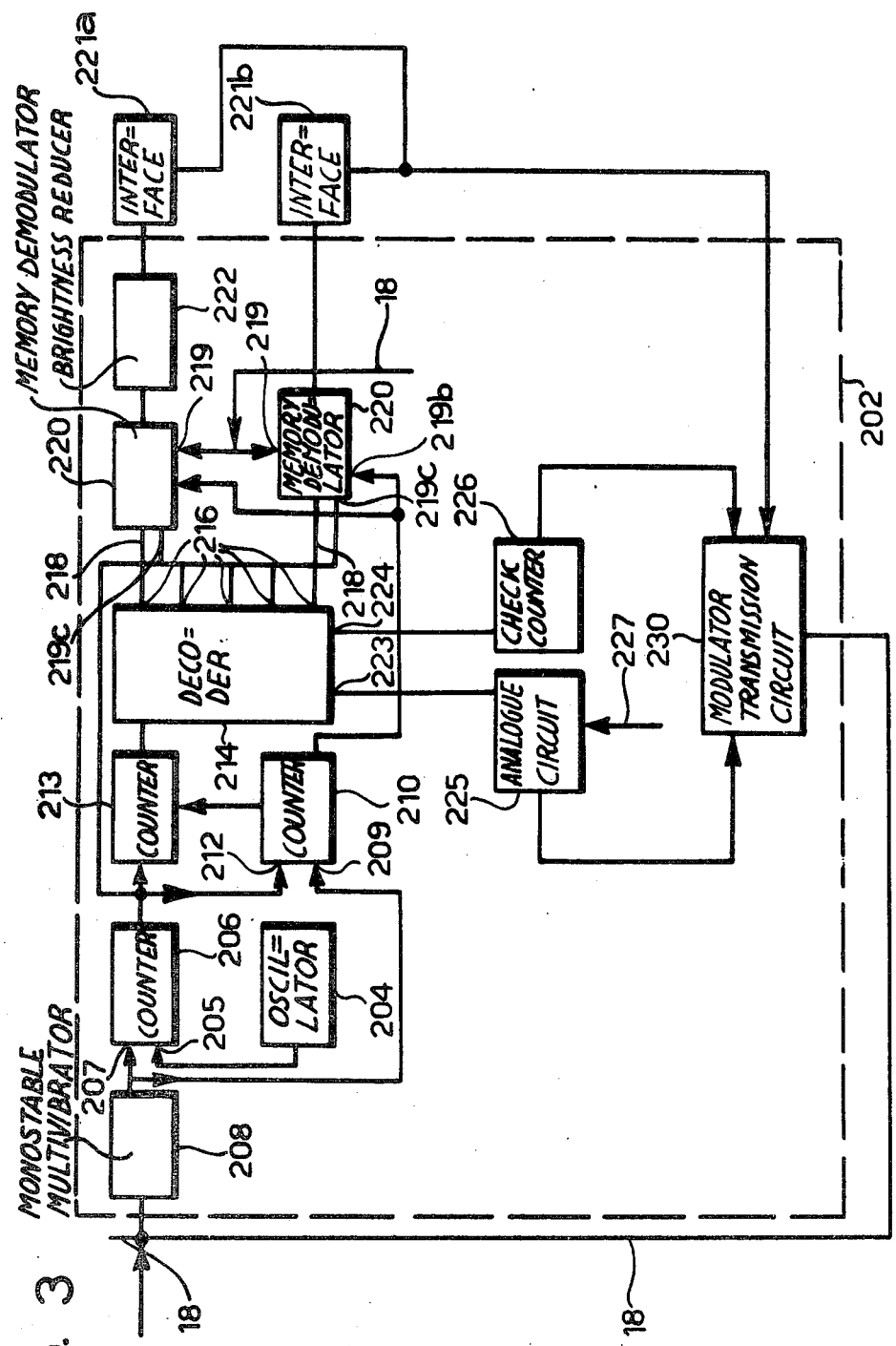
FIG. 3 is a block diagram of one of the remote control units of the system shown in FIG. 1.

In FIG. 3, which illustrates in detail the left rear remote control unit 7 of FIG. 1, there is shown an oscillator 204 connected to a first or set input 205 of a counter 206 to the second or reset input 207 of which is fed a reset signal from a monostable multibivrator 208 to the input of which is fed the signal appearing on the control line 18.

The reset signal from the monostable 208 is also fed to a first input 209 of a break or pause counter 210 to whose second input 212 is fed a synchronized clock signal from the output of the counter 206. The clock signal is also fed to a channel scan counter 213 the output of which is connected to a decoder 214 having a plurality of outputs 216 leading to respective first inputs 218 of respective memory-demodulators 220 having second inputs 219 which are fed with signals from the control line 18; the memory-decoders 220 also have third inputs 219b to which are fed the output of the break or pause counter 210, and fourth inputs 219c to which are fed the output signal from the counter 206. The outputs from the memory-decoders 220 are connected to power stages 221a, 221b which control the connection of the power line 13 to associated current consumers (not shown) in a known way. The power stage 221a controls, for example, the vehicle lights; with this circuit is associated a circuit 222 for reducing the brightness of the lights, which is shown in detail in FIG. 12.

The decoder 214 also has two further outputs 223 and 224 which lead respectively to an analogue circuit 225 and to a check counter 226; to the analogue circuit 225 is fed a signal representing the level of fuel in the fuel tank derived, for example, from a float 227 within the fuel tank. The analogue circuit 225 and the check counter 226 have respective outputs connected to a modulator and transmission circuit 230 at respective inputs thereof; the modulator and transmission circuit has an output connected to the control line 18.

The modulator and transmission circuit 230 also receives an input signal from check circuits incorporated in the power stages 221.

FIG. 4 is a block diagram of the analogue circuit 225 shown in FIG. 3. In this the signal from the float 227 is fed to a comparator 304 which is connected to the transmission and modulator circuit 230 of FIG. 3 connected in its turn to the control line 18. A counter 310 is connected at a point 308 to the line 18 and produces an output signal which is fed to a digital-to-analogue converter 312 which acts as a staircase waveform generator and is connected in its turn to the comparator 304.

In FIG. 5 is shown, as a function of time t, plotted on the abscissa, the output voltage of the counter 310 of FIG. 4, plotted on the ordinate. In FIG. 6 is shown, as a function of time t, plotted on the abscissa, the output voltage from float 227 of FIG. 4, plotted on the ordinate. In FIG. 7 is shown, as a function of time t, plotted on the abscissa, the staircase waveform voltage at the output of digital-to-analogue converter 312 of FIG. 4. FIG. 8 shows the output voltage from the comparator 304 of FIG. 4, plotted on the ordinate, as a function of time t, plotted along the abscissa. FIG. 9 shows, as a function of time t, plotted along the abscissa, the output voltage from the filter 134 of FIG. 2, plotted on the ordinate.

In FIG. 10 is shown one part of the voltage signal on the line 18, the continuous line representing the situation when a control element, for example a switch on the control panel 11 is open, and the broken line representing the situation when the control element is closed.

FIG. 11 illustrates a check circuit by which the continuity of the circuit can be tested. This circuit comprises an indicator lamp 802 connected to the collector of a transistor 804 the emitter of which is connected to earth. The collector of the transistor 804 is also connected to a resistance 806 which is also connected to earth. Between the resistance 806 and a 12 volt supply line are connected a diode 808 and a resistance 810 in series. The bulb 802 is also connected to the 12 volt feed voltage line 13. The junction point between the diode 808 and the resistance 810 is indicated by the reference B for further identification in the description of the operation of this circuit which is given below, and the junction point of the resistance 810 with the 12 volt supply line is likewise indicated by the reference C.

In FIG. 12 which illustrates a circuit for selectively reducing the brightness of the brake and indicator lights there is shown an AND gate 702 to one of the inputs 703 of which is fed the signal controlling operation of the rear lights whilst to its other input is fed a high frequency signal. The output of the AND gate 702 is fed to a first input 705 of an AND gate 704 to the second input of which is fed the brake light or indicator signal. The output from the gate 704 is connected to the base of a transistor 706 the emitter of which is connected to earth and the collector of which is connected to a consumer 708 (that is a brake light or indicator light) which is connected to the feed voltage (not shown in FIG. 12).

The system described above operates as follows:

When a number of control switches or other devices on the instrument panel 11 are operated the multiplexer 106 of the central control unit 9 is fed with a plurality of control signals in parallel, and operates to code these signals and to produce at its output a sequence of logic signals which are fed out serially to the modulator 116.

The output logic signals fed to the modulator 116 are formed by a square wave carrier signal or "line clock" modulated in time in dependence on the value of the signals from the multiplexer 106.

The signal shown in FIG. 10 shows in solid line the form of three successive pulses representing three channels in the case where the control members (switches) of the instrument panel 11 associated with those three channels are not operated, and in broken line the same three channels showing the form of the modulated signal when the associated switches are operated. This modulation is achieved as follows.

The line frequency oscillator 112 feeds the counter 110 and causes it to advance continuously. The output from the counter 110 clocks the multiplexer 106 to feed the parallel input signals serially to modulator 116. The counter, as discussed above, can count to a maximum number which exceeds the number of channels or input lines fed to the multiplexer 106 and after the counter has reached a count equal to the number of input lines to the multiplexer 106 (the transmission channels) there is a pause during which no signals are transmitted onto the line 18 by the modulator 116 due to the action of the first decoder 111 which blocks the modulator 116 until the counter has reached its maximum count and starts again at the beginning of its cycle whereupon a new set of modulated channel signals are fed onto the control line 18.

During the pause in transmission the control line 18 is used to transmit signals from the remote control units which are received at point 146 and applied to the inputs of the first and second memory demodulators 122, 124. The signals received from the remote control units comprise a check signal which is generated in a manner which will be described below and a signal representing the fuel level from the analogue circuit 225 (FIGS. 3 and 4). The second decoder gates these signals into the memory demodulators during appropriate periods. The output from the first memory demodulator 122 is fed to a power interface circuit 130 which controls a check warning light 132 located on the instrument panel 11. The output signal from the second memory demodulator is fed to the low pass filter circuit 134 and from there to a power interface circuit 140 which controls a fuel gauge 142.

The modulated signals from modulator 116 fed onto the control line 18 are transmitted to the remote control units which distribute to actuators, such as power transistors, associated with the current consumers to which they are connected, the signals which they receive on the appropriate channels associated one with each consumer controlled from the remote control unit. In order to explain this distribution reference will be made to FIG. 3; in each remote control unit is generated a clock signal which enables location of a given instant during the pulse. As will be seen from FIG. 10 the unmodulated signals comprise a plurality of regularly spaced square pulses so that at the mid-point of each pulse the signal is at the high voltage level. If a pulse is modulated, however, as shown by the broken line in FIG. 10, the signal is held low until after the mid-point of the positive pulse (hereinafter termed the half-period point) so that at this point in each cycle the signal on the line 18 is either high or low according as the signal is unmodulated or modulated indicating that the associated control switch on the panel 11 is on or off. The clock signal is generated, as shown in FIG. 3 by an oscillator 204 which generates a frequency 16 times higher than that of the oscillator 112 of the central control unit 9 which determines the frequency of the pulse signal on the line 18. The counter 206 divides such clock signal by 16 to produce signals at the same frequency as the pulses on the line 18. The monostable multivibrator 208 resets the counter 206 at the beginning of each pulse on the line 18 so as to avoid the summing of the unavoidable difference of the synchronism between pulses on line 18 and the counter 206 output. As may be seen from FIG. 10, given the appreciable displacement of the leading edge of the pulse signal on the line between non-modulated and modulated states, a substantial tolerance is acceptable on this synchronization. The state of the line signal at the half period point determined by a decoder 214 is memorized in one of the memory-demodulators 220 of which there is one for each consumer controlled by the remote control unit, until the following scan cycle.

The counter 213 counts through the signals fed from the counter 206 and feeds the decoder 214 which determines from the input signals which of the consumers is to be activated, that is the actuator to which must be furnished the control information transmitted on the line.

The counter 210 has the following function: if the signal from the monostable 208 is not received for a certain predetermined number of periods, that is during the break or pause in transmission from the central control unit 9, the counter 210, no longer reset by 208, counts to a certain number H and resets the channel counter 213. If, on the other hand, the signal from the monostable 208 is not received after the said predetermined number of periods, a fault is indicated and counter 210 counts up to a number K (>H), which is detected, and switches off all the consumers by cancelling the memory demodulators 220.

From decoder 214, the signals which enable the analogue and check circuit lead to these circuits and the processed signals from these circuits, as will be described below, lead to a transmission circuit modulator 230 which feeds them onto the control line 18. This occurs during the break or pause period after each scan of the channels from the central control unit 9. The remote control unit is then in its transmission condition and the signals it receives from the control devices to which it is connected are modulated and transmitted in series towards the central control unit on the line 18 in a predetermined sequence (channels) in the same way as a sequence of signals is transmitted to the remote control unit from the central control unit.

The identification of the various channels is effected by means of a break in the line signal; the first channel following this break is then detected as the first of the sequence and the others follow in order. This detection occurs in the following manner: with reference to FIG. 3, the counter 206 is fed with signals by oscillator 204 and is reset by the monostable 208 during the transmission time of the central control unit. During the break or pause, however, the monostable no longer provides the reset signal and the counter 206 thus continues to count until the break or pause is identified.

The coded pulse system described may be used for the transmission of analogue data from signals which slowly vary with time, such as for example a signal representing the fuel level, by utilizing the line signals which, as already said above, may only assume the two levels high and low. Such transmission is achieved by a quantization method. With reference to FIG. 4, in the analogue circuit 225 of the remote control unit 9, which happens to be the one nearest to the fuel tank, a staircase waveform is generated by the digital-to-analogue converter 312, each step of which corresponds to the smallest detectable variation in the value of the fuel level signal.

The staircase waveform progressively increases as a stepped ramp under the control of the counter 310, until the end of the period during which the analogue information is to be transmitted at which time a signal is received which resets the counter 310 and the generation of the staircase ramp commences again. The comparator 304 to which the staircase waveform is fed also receives a voltage analogue signal representing the fuel level, this voltage analogue signal is shown in FIG. 6, and the output from the comparator 304 is a square wave signal which is high for the time during which the staircase waveform is below the level of the analogue signal (FIG. 6) and low for the time during which the staircase is above the level of the analogue signal, as shown in FIG. 8. Thus the lower the fuel level the longer is the time for which the output signal from the comparator 304 remains low. This signal is transmitted through the transmission circuit 230 onto line 18 which feeds it to the memory demodulator 124 of FIG. 2, which latter is enabled during this time period by a signal from the decoder 114 matching the signal from the decoder 214 which enables the counter 310 of the analogue circuit 225. The output signal from the demodulator 124, filtered by the low-pass filter 134, is shown in FIG. 9; as is seen this signal is in practice the average value of the square wave signal which is received during this time period and corresponds to the voltage level given by the intersection between the staircase waveform and the variable analogue signal; this is exactly the signal that it was desired to transmit to the fuel level indicator on the instrument panel.

The particular structure of the system described has other advantageous features; for example it enables a continuous check to be made on the operation of the lamp filaments as follows. Every 2 seconds for a period of 0.5 milliseconds all the control signals to the consumers are completely switched off. This switching off is for such a short time that its effect is not noticeable and therefore it does not disturb the normal working of the consumers. In order to provide a check on the operations of the consumers each has a circuit of the type indicated in FIG. 11 associated with it. In this circuit the resistance 806 is high in relation to the resistance of the consumer which in the circuit illustrated in FIG. 11, is a light bulb, and likewise resistance 810 is high in relation to the resistance 806, the ratio of resistance being in the region of 1:30.

As the check takes place the transistor 804 is switched off effectively causing an open circuit between the bulb 802 and earth. If the bulb 802 is undamaged, then due to the high value of the resistance 806 with respect to that of the bulb 802, the collector of the transistor will be found around the potential of the positive pole of the feed battery, and the diode 808 will be just in conduction so that point B will be near the potential of point C, that is the battery potential.

If, on the other hand, the bulb 802 has a broken filament, the diode 808 will be in strong conduction and, given the ratio of about 1:30 of resistances 806 and 810, point B will be found at a potential near that of earth. A signal taken from point B will thus be high or low according as to whether the bulb is working or not and this signal can be fed (by means not shown in the drawings) to the transmission circuit 230 from where it is fed onto the control line 18 to be received at the memory demodulator 122 from where it is passed to the warning lamp on the instrument panel.

The system described may also be provided with means for the reduction of the brightness of the brake lights and indicator lights in dependence on whether the rear lights are on or not. Starting from the signals of the counter 206 in FIG. 3, it is possible by known techniques to produce a well determined square wave signal at very high frequency. This signal may be fed to one input of the AND gate 702 of FIG. 12 (which is a block diagram of unit 222 of FIG. 3) to the other input 703 of which is fed the signal to switch on the rear lights, derived from the corresponding memory 220 of FIG. 3. The gate 702 thus permits the passage of the high frequency signal to the input 705 of AND gate 704 to the other input of which is fed the switching-on signal of the stop lights and the indicator lights, derived from the memory 220 associated therewith. Thus when the rear lights are switched on the AND gate 704 passes the control signal, where it is applied thereto, to energize the consumer 708, which may be brake lights or indicator lights, by turning on the power transistor 706, modulated by the high frequency signal which thus effectively cuts out a proportion of the signal thereby reducing the intensity of the lights by the well known chopper effect.

I claim:

1. Apparatus for the distribution of electrical energy on board vehicles, such as automobiles from a source of electric current to one or more of a plurality of electric current consumers, comprising:
   (a) at least one power line,
   (b) at least one control signal line,
   (c) at least one central control unit, including
      (i) means for generating pulse width coded signals identifying the consumers to be energized,
      (ii) means for transmitting said pulse width coded signals onto said control signal line,
      (iii) decoding means for decoding pulse signals received from said control signal line, and
   (d) a plurality of remote control units each associated with a group of current consumers of said vehicle and connected to said control signal line, said remote control units operating to connect selected consumers to said power line to put them into operation in dependence on said pulse width coded signals received on said control signal line from said central control unit, wherein each said remote control unit includes:
      (i) an oscillator producing an output signal the frequency of which is a multiple of that of said pulse signal applied to said control signal line by said at least one central control unit,
      (ii) a first counter having a set input connected to the output of said oscillator and a reset input,
      (iii) a trip circuit having an input connected to said control signal line and an output connected to said reset input of said first counter,
      (iv) a second counter having a first input connected to the output of said trip circuit,
      (v) a third counter having a first input connected to the output of said second counter and a second input connected to the output of said first counter,
      (vi) a decoder connected to the output of said third counter, said decoder having a plurality of outputs,
      (vii) a plurality of memory demodulators connected to respective associated first outputs from said decoder, the outputs from said memory demodulators being connected to respective consumers,
      (viii) an analogue circuit connected to a second output from said decoder,
      (ix) consumer checking means connected to a third output from said decoder, wherein said consumer checking means comprises, for each consumer,
      a transistor the emitter of which is earthed and the collector of which is connected to the associated consumer, means connecting said consumer to said power line, first and second resistors,
      means connecting the collector of said transistor to one terminal of said first resistor the other terminal of which is earthed,
      a diode,
      means connecting said one terminal of said first resistance to the cathode of said diode,
      means connecting the anode of said diode to said second resistor, and
      means connecting said second resistor to said power line, and
      (x) a transmission circuit-modulator connected to the outputs from said analogue circuit and consumer checking means and having an output connected to transmit pulse signals onto said control signal line.

2. Apparatus for the distribution of electrical energy on board vehicles, such as automobiles from a source of electric current to one or more of a plurality of electric current consumers, comprising:
   (a) at least one power line,
   (b) at least one control signal line,
   (c) at least one central control unit, including
      (i) means for generating pulse width coded signals identifying the consumers to be energised,
      (ii) means for transmitting said pulse width coded signals onto said control signal line,
      (iii) decoding means for decoding pulse signals received from said control signal line, and
   (d) a plurality of remote control units each associated with a group of current consumers of said vehicle and connected to said control signal line, said remote control units operating to connect selected consumers to said power line to put them into operation in dependence on said pulse width coded signals received on said control signal line from said central control unit, wherein each said remote control unit includes:
      (i) an oscillator producing an output signal the frequency of which is a multiple of that of said pulse signal applied to said control signal line by said at least one central control unit,
      (ii) a first counter having a set input connected to the output of said oscillator and a reset input,
      (iii) a trip circuit having an input connected to said control signal line and an output connected to said reset input of said first counter,
      (iv) a second counter having a first input connected to the output of said trip circuit,
      (v) a third counter having a first input connected to the output of said second counter and a second input connected to the output of said first counter,
      (vi) a decoder connected to the output of said third counter, said decoder having a plurality of outputs,
      (vii) a plurality of memory demodulators connected to respective associated first outputs from said decoder, the outputs from said memory demodulators being connected to respective consumers,
      (viii) a circuit for reducing the brightness of the brake lights of the automobile when the vehicle lights are illuminated, said circuit comprising:
      means generating a high frequency square wave signal,
      a first AND gate having two inputs one of which is connected to the output from the memory demodulator associated with the vehicle lights and the other of which is connected to the output of said means generating a high frequency square wave signal,
      a second AND gate having two inputs one of which is connected to the output from said first AND gate and the other of which is connected to the output of the memory demodulator associated with the brake lights, (ix) an analogue circuit connected to a second output from said decoder, (x) consumer checking means connected to a third output from said decoder, and (xi) a transmission circuit-modulator connected to the outputs from said analogue circuit and consumer checking means and having an output connected to transmit pulse signals onto said control signal line.

3. Apparatus for the distribution of electrical energy on board vehicles, such as automobiles from a source of electric current to one or more of a plurality of electric current consumers, comprising:

(a) at least one power line, (b) at least one control signal line, (c) at least one central control unit, including
   (i) means for generating pulse width coded signals identifying the consumers to be energized,
   (ii) means for transmitting said pulse width coded signals onto said control signal line,
   (iii) decoding means for decoding pulse signals received from said control signal line, and (d) a plurality of remote control units each associated with a group of current consumers of said vehicle and connected to said control signal line, said remote control units operating to connect selected consumers to said power line to put them into operation in dependence on said pulse width coded signals received on said control signal line from said central control unit, wherein each said remote control unit includes:
   (i) an oscillator producing an output signal the frequency of which is a multiple of that of said pulse signal applied to said control signal line by said at least one central control unit,
   (ii) a first counter having a set input connected to the output of said oscillator and a reset input,
   (iii) a trip circuit having an input connected to said control signal line and an output connected to said reset input of said first counter,
   (iv) a second counter having a first input connected to the output of said trip circuit,
   (v) a third counter having a first input connected to the output of said second counter and a second input connected to the output of said first counter,
   (vi) a decoder connected to the output of said third counter, said decoder having a plurality of outputs,
   (vii) a plurality of memory demodulators connected to respective associated first outputs from said decoder, the outputs from said memory demodulators being connected to respective consumers,
   (viii) a circuit for reducing the brightness of the indicator lights of the automobile when the vehicle lights are illuminated, said circuit comprising:
      means generating a high frequency square wave signal,
      a first AND gate having two inputs one of which is connected to the output from the memory demodulator associated with the vehicle lights and the other of which is connected to the output of said means generating a high frequency square wave signal,
      a second AND gate having two inputs one of which is connected to the output from said first AND gate and the other of which is connected to the output of the memory demodulator associated with the indicator lights,
   (ix) an analogue circuit connected to a second output from said decoder,
   (x) consumer checking means connected to a third output from said decoder, and
   (xi) a transmission circuit-modulator connected to the outputs from said analogue circuit and consumer checking means and having an output connected to transmit pulse signals onto said control signal line.

4. Apparatus for the distribution of electrical energy on board vehicles, such as automobiles from a source of electric current to one or more of a plurality of electric current consumers, comprising:

(a) at least one power line, (b) at least one control signal line, (c) at least one central control unit, including
   (i) means for generating pulse width coded signals identifying the consumers to be energized,
   (ii) means for transmitting said pulse width coded signals onto said control signal line,
   (iii) decoding means for decoding pulse signals received from said control signal line, and (d) a plurality of remote control units each associated with a group of current consumers of said vehicle and connected to said control signal line, said remote control units operating to connect selected consumers to said power line to put them into operation in dependence on said pulse width coded signals received on said control signal line from said central control unit, wherein each said remote control unit includes:
   (i) an oscillator producing an output signal the frequency of which is a multiple of that of said pulse signal applied to said control signal line by said at least one central control unit,
   (ii) a first counter having a set input connected to the output of said oscillator and a reset input,
   (iii) a trip circuit having an input connected to said control signal line and an output connected to said reset input of said first counter,
   (iv) a second counter having a first input connected to the output of said trip circuit,
   (v) a third counter having a first input connected to the output of said second counter and a second input connected to the output of said first counter,
   (vi) a decoder connected to the output of said third counter, said decoder having a plurality of outputs,
   (vii) a plurality of memory demodulators connected to respective associated first outputs from said decoder, the outputs from said memory demodulators being connected to respective consumers,
   (viii) an analogue circuit connected to a second output from said decoder, wherein said analogue circuit includes:
      a comparator having two inputs,
      means for deriving electrical signals representing the position of a float in the fuel tank of the automobile,
      means connecting one input of said comparator to the output of said means for deriving electrical signals representing the position of said float,
      a digital-to-analogue converter, means connecting the other of said two inputs of said comparator to the output of said digital-to-analogue converter,
a counter,
means connecting the output of said counter to said digital-to-analogue converter, and
means connecting the input of said counter to said control signal line, (ix) consumer checking means connected to a third output from said decoder, and
(x) a transmission circuit-modulator connected to the outputs from said analogue circuit and said comparator of said consumer checking means and having an output connected to transmit pulse signals onto said control signal line.

* * * * *